(12) United States Patent
Tamborini et al.

(10) Patent No.: US 11,653,622 B2
(45) Date of Patent: May 23, 2023

(54) CAGE FOR HOUSING LABORATORY ANIMALS

(71) Applicant: TECNIPLAST S.P.A., Buguggiate (IT)

(72) Inventors: Diego Tamborini, Daverio (IT); Fabio Ciceri, Daverio (IT); Pietro Bernardini, Casciago (IT)

(73) Assignee: TECNIPLAST S.P.A., Buguggiate (IT)

( * ) Notice: Subject to any disclaimer, the term of this patent is extended or adjusted under 35 U.S.C. 154(b) by 0 days.

(21) Appl. No.: 17/475,858

(22) Filed: Sep. 15, 2021

(65) Prior Publication Data

US 2022/0087214 A1 Mar. 24, 2022

(30) Foreign Application Priority Data

Sep. 18, 2020 (IT) .................. 102020000022057

(51) Int. Cl.
*A01K 1/03* (2006.01)

(52) U.S. Cl.
CPC .................... *A01K 1/031* (2013.01)

(58) Field of Classification Search
CPC . A01K 1/00; A01K 1/03; A01K 1/031; A01K 1/06
See application file for complete search history.

(56) References Cited

U.S. PATENT DOCUMENTS

| | | | | |
|---|---|---|---|---|
| 1,487,789 A | * | 3/1924 | McBride | A01K 31/06 |
| 2016/0120153 A1 | * | 5/2016 | Iriki | A01K 29/00 |
| 2020/0128781 A1 | * | 4/2020 | Baboo | A01K 1/03 |

FOREIGN PATENT DOCUMENTS

| | | |
|---|---|---|
| CH | 596750 A5 | 3/1978 |
| CN | 105532490 B | 3/2019 |
| EP | 3005869 A1 | 4/2016 |
| EP | 3643164 A1 | 4/2020 |

OTHER PUBLICATIONS

Search Report & Written Opinion received for the Italian Patent Application No. 202000022057, dated May 7, 2021, 7 pages.

* cited by examiner

*Primary Examiner* — Joshua J Michener
*Assistant Examiner* — Henry Hooper Mudd
(74) *Attorney, Agent, or Firm* — Amster, Rothstein & Ebenstein LLP (57) ABSTRACT

An animal cage having a rectangular main body with a bottom, top and sidewalls defining a first inner space for the animals. A first sidewall of the main body includes a first opening to allow access into the first inner space. Attached to the cage is a secondary rectangular body having a bottom, upper and sidewalls defining a second inner space. First and second sidewalls of the secondary body respectively include second and third openings, the second opening being parallel and aligned with the first opening, and the third opening being formed orthogonal to the first and second openings. The first sidewall of the main body includes a rotatable gate that is switchable between a first position which closes the first opening, and a second position which clears the first and second openings while rotated into the second inner space and closes the third opening of the secondary body.

15 Claims, 9 Drawing Sheets

Fig. 9

CAGE FOR HOUSING LABORATORY ANIMALS

CROSS-REFERENCE TO RELATED APPLICATION

This application claims priority to Italian application No. 102020000022057 filed Sep. 18, 2020, the content of which is incorporated by reference herein in its entirety.

TECHNICAL FIELD OF THE INVENTION

The present invention relates to the field of housing of laboratory animals. In particular, the present invention relates to a cage for housing laboratory animals, particularly primates, such as apes, monkeys, or the like. In detail, the present invention relates to a cage of the aforesaid type comprising a porch modified according to an innovative solution to allow access to the inner space of the cage through said porch. In yet greater detail, the present invention relates to a housing cage of the aforesaid type comprising a main body which defines an inner space available to said laboratory animals, wherein said main body comprises a gate switchable to alternately open and close an opening of said main body through which an operator can gain access to said inner space and thus to the animals inside the cage, and wherein said gate, in the position in which it provides access to said inner space, constitutes part of said porch.

BACKGROUND ART

The use of cages comprising a so-called "porch" is widespread today for the housing of laboratory animals, in particular of laboratory primates, e.g., such as monkeys or the like, said porch being applied externally to the main body of the cage, the inner space defined by the said main body and that defined by the said porch being in mutual communication to increase the space available for the animals.

Said porches are thus an enrichment (compared to the cages which do not have them) because they can be used by the animals as seats and/or elevated observation points and/or play spaces and thus significantly contribute to the welfare of the animals.

In practice, the porches of the known type comprise a substantially box-shaped body comprising closed side walls and at least one open wall, said closed walls and said open wall being mutually joined and connected.

The porch is then externally attached to a side wall (usually the front wall) of the main body of the cage so that the open side wall of the porch coincides with an opening (fitted with a gate) defined by said side (front) wall of the main body.

Furthermore, it is worth noting that the housing of animals requires the periodic care of the animals themselves which, to be subjected to operations, such as injections, administration of drugs and/or feeding or the like, must be at least partially restrained inside the cage.

For this purpose, the cages with porch of the known type comprise a movable partition arranged inside the main body parallel to said side wall comprising said opening with gate, wherein the animals are at least partially restrained as follows.

Firstly, the gate is closed so that the opening which allows access to the porch from inside the main body is closed as well.

Then, the movable partition is gradually brought closer to said side (front) wall of the main body provided with an opening with gate to equally gradually reduce the space available to the animals, wherein as soon as the desired (at least partial) restraint of the animals is achieved, an operator can proceed with the planned and/or necessary operation.

However, although appreciable from many points of view, e.g., the simplicity of construction and/or of application and removal respectively to and from the main body of the cage, the porches of the known type have several drawbacks and/or disadvantages that the applicant intends to overcome or at least reduce by means of the invention described in this application.

A first drawback is related to the fact that the porches of the known type, once installed, i.e., fixed to the main body of the cage in the manner outlined above, are always a hindrance for the person who needs to access the animal for the common operations of monitoring, administrating drugs or other.

Indeed, as described above, the operations normally take place by relegating the animal in the front part of the cages by means of said partition (also called an immobilizer) taking care to close the access to the porch through the dedicated gate.

It is thus apparent that the porch is located in this manner between the operator and the animal, preventing access to the animal by the operator who will always have to remove the porch completely to access the animal. Therefore, since access to the animals is required with a given frequency, it can also be seen that the repeated assembly and disassembly of the porch is a negative factor in terms of waste of time.

A further drawback found in cages with porches of the known type is that the gate of the opening on the front wall of the cage is usually of the translational switchable type, wherein the closing of said gate results in the risk for the animal which could be trapped and possibly injured between the gate and one of the two opposite edges of said opening; in other words, there is the risk of a "guillotine" effect generated by the switching by translation of the gate from the opening to the closing position.

It is the main object of the present invention to overcome or at least reduce or minimize the aforesaid drawbacks found in the cage with porch according to the prior art.

In particular, it is a first object of the present invention to provide a cage with porch for housing laboratory animals designed so that the porch does not constitute a hindrance and/or obstacle to an operator needing to gain access to the animals, and thus which does not need to be removed to allow access to the animals by an operator.

It is a further object of the present invention to suggest a porch adapted to be fixed and removed respectively to and from the main body of a cage according to simple and immediate operations which do not require the use of tools, thereby further reducing the risk of injury to animals.

In particular, it is one of the objects of the present invention to make available a cage for housing laboratory animals comprising an innovative gate the switching of which from opening to the closing position does not generate any risk of entrapment or possible injury for the animal.

SUMMARY

The cage according to the present invention originates from the general consideration that the drawbacks found in the cages with porches of known type can be effectively overcome or at least reduced achieving the intended purposes by means of a cage the gate of which, once switched to the opening position, forms an integral part of the porch and contributes to confining the inner space defined by the porch.

Furthermore, a further consideration underlying the present invention is the fact that the drawbacks encountered in cages with porches of known type can be effectively overcome or at least reduced achieving the intended purposes by means of a porch comprising a side wall switchable to a position in which, with the gate in the opening position, it closes the opening of the main body served by said gate and thus replaces said gate.

To overcome or at least reduce the drawbacks found in the cages with porch according to the prior art and based on the considerations provided above, according to a first embodiment the present invention relates to a cage for housing laboratory animals, said cage comprising a main box-shaped body comprising a bottom wall, an upper wall, and a plurality of side walls, said bottom wall, upper wall, and side walls being connected and joined together to define a first inner space available to said laboratory animals, wherein a first side wall of said main box-shaped body comprises a first opening adapted to allow the access to said inner space from the outside by an operator, and wherein said first side wall comprises a gate which is switchable between a first position, in which it substantially closes said first opening, and a second position, in which it at least partially clears said first opening, wherein said cage comprises a secondary box-shaped body consisting of a bottom wall thereof, an upper wall thereof and a plurality of side walls thereof, said bottom wall, upper wall and side walls of said secondary box-shaped body being connected and joined together to define a second inner space, wherein a first own side wall of said secondary box-shaped body comprises a second opening, said secondary box-shaped body being adapted to be externally applied to said first side wall of said main box-shaped body with said second opening at said first opening to allow said laboratory animals, with said gate in said second position, to access from said first inner space to said second inner space and vice versa, from said second inner space to said first inner space; wherein said gate comprises a rotationally switchable door, wherein a second side wall of said secondary box-shaped body joined to said first side wall of said secondary box-shaped body comprises a third opening, and wherein the switching of said door from said first position to said second position results in the closing of said third opening.

According to an embodiment, said gate comprises two doors, each being rotationally switchable, wherein a third side wall of said secondary box-shaped body joined to said first side wall and opposite to said second side wall of said secondary box-shaped body comprises a fourth opening, and wherein the switching of said doors from said first position to said second position results in the closing of said third opening and fourth opening, respectively.

According to an embodiment, the side wall of said secondary box-shaped body opposite to said first side wall of said main box-shaped body is switchable and positionable so as to close said second opening of said first wall of said secondary body and said first opening of said first side wall of said main box-shaped body.

According to an embodiment, said side wall of said secondary box-shaped body opposite to said first side wall of said main box-shaped body is translationally switchable along parallel guides defined by said bottom wall of said secondary box-shaped body.

According to an embodiment, said upper wall of said secondary box-shaped body is switchable between a first closing position, in which it prevents the access to said second inner space by an operator, and a second opening position, in which it allows the access to said second inner space by an operator.

According to an embodiment, said upper wall of said secondary box-shaped body is rotationally switchable about a rotation axis parallel to the intersection between the planes on which said bottom wall of said secondary box-shaped body and said first side wall of said main box-shaped body, respectively, lie.

According to an embodiment, said upper wall of said secondary box-shaped body is translationally switchable on a plane parallel to said bottom wall.

According to an embodiment, said cage comprises an intermediate wall positioned inside said main body and substantially parallel to said first side wall, wherein said intermediate wall is translationally switchable along a direction which is substantially perpendicular to said first side wall of said main box-shaped body.

According to an embodiment, said intermediate wall is switchable between a first position, in which it is close to said first side wall of said main box-shaped body, and a second position, in which it is adjacent to the side wall of said main box-shaped body opposite to said first side wall of said main box-shaped body, wherein the translational switching of said intermediate wall from said second position to said first position results in the reduction of the space available to said laboratory animals.

According to an embodiment, the side walls of said main box-shaped body are opposed two-by-two, parallel to each other and have dimensions corresponding two-by-two.

According to an embodiment, said bottom wall and upper wall of said main box-shaped body are parallel and have corresponding dimensions.

According to an embodiment, the side walls of said secondary box-shaped body are opposed two-by-two, parallel to each other, and have dimensions corresponding two-by-two.

According to an embodiment, said bottom wall and upper wall of said secondary box-shaped body are parallel and have corresponding dimensions.

According to an embodiment, at least said first wall of said main box-shaped body comprises a mesh-shaped portion or a portion comprising tubular elements made of plastic or metal material.

According to an embodiment, at least said side wall of said secondary box-shaped body opposite to said first side wall of said main box-shaped body and switchable and positionable so as to close both said second opening of said first wall of said secondary body and said first opening of said first side wall of said main box-shaped body comprises a mesh-shaped portion or a portion including tubular elements made of plastic or metal material.

Further possible embodiments of the present invention are defined in the claims.

BRIEF DESCRIPTION OF THE FIGURES

In the following, the present invention will be further explained by means of the following detailed description of its embodiments as depicted in the drawings, in which corresponding or equivalent features and/or component parts of the present invention are identified by the same reference numerals. It must be noted that the present invention is not limited to the embodiments described in the following and depicted in the accompanying drawings; on the contrary, all the variants of and/or changes to the embodiments described hereafter and depicted in the accompanying drawings which will appear obvious and immediate to a person skilled in the art fall within the scope of the present invention.

In the drawings.

DETAILED DESCRIPTION OF THE PRESENT INVENTION

The present invention is particularly applied in the field of laboratory animal housing, this being the reason why the present invention is described hereafter with particular reference to its applications in the field of animal housing.

However, it is worth specifying that the possible applications of the present invention are not limited to those described hereafter. On the contrary, the present invention finds convenient application in all cases in which it is necessary to optimize access to animals inside a cage with a porch. For example, the present invention finds equally advantageous application in the field of housing and/or transporting of pets.

In the figures, the cage according to the embodiment of the present invention depicted therein is identified by reference numeral 10 as a whole; as depicted, the cage 10 comprises a substantially box-shaped (parallelepiped-shaped) main body 11 consisting of a bottom wall 12, an upper wall 13, and a plurality of side walls 14, 15, 16, 17, said bottom wall 12, upper wall 13, and side walls 14, 15, 16, 17 being connected and joined together to define a first inner space Si1 available to said laboratory animals, wherein a first (front) side wall 14 of said main box-shaped body 11 comprises a first opening 18 adapted to allow the access to said inner space from the outside by an operator (as well as the access to the porch by the animals in the cage, as shown in the following description), and wherein said first side wall 14 comprises a gate 19 which is switchable between a first position, in which it substantially closes said first opening 18, and a second position, in which it at least partially clears said first opening 18. The cage 10 further comprises a porch comprising a secondary box-shaped (parallelepiped-shaped) body 30, consisting of a bottom wall 31 thereof, a upper wall 32 thereof and a plurality of side walls 33, 34, 35, 36 thereof, said bottom wall 31, upper wall 32 and side walls 33, 34, 35, 36 of said secondary box-shaped body 30 being connected and joined together to define a second inner space Si2, wherein a first (front) side wall 35 of said secondary box-shaped body 30 comprises a second opening 37, the dimensions of which substantially correspond to those of the wall 35; as shown, said secondary box-shaped body 30 is adapted to be externally applied to said first side wall 14 of said main box-shaped body 11 with said second opening 37 at said first opening 18 to allow said laboratory animals, with said gate 19 in said second position (in which it clears the opening 18 of the wall 14), to access from said first inner space Si1 to said second inner space Si2 and vice versa, from said second inner space Si2 to said first inner space Si1.

Figure 1:
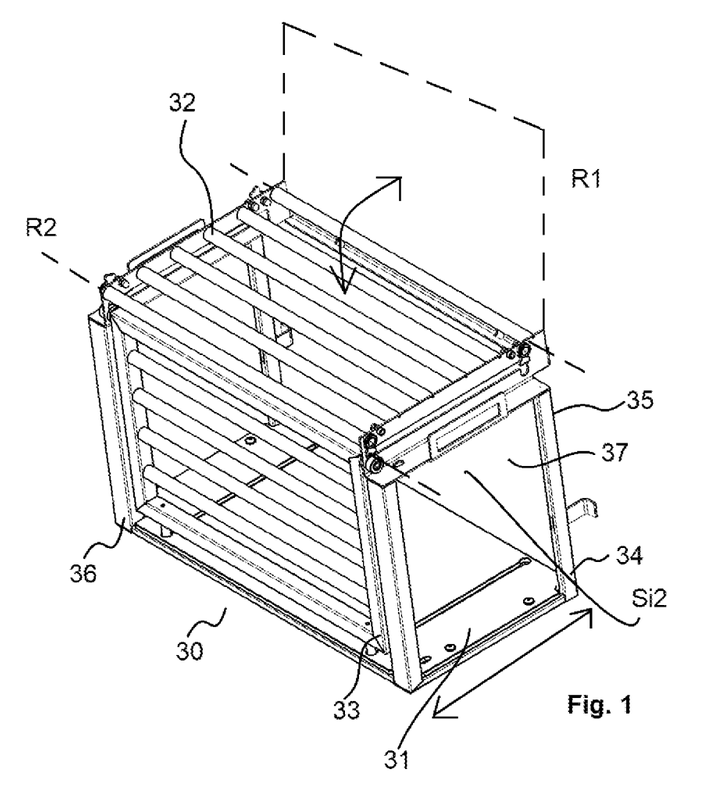
FIG. 1 shows a perspective view of a porch for cages according to an embodiment of the present invention with the rear wall in a rearward end stop position.
Figure 2:
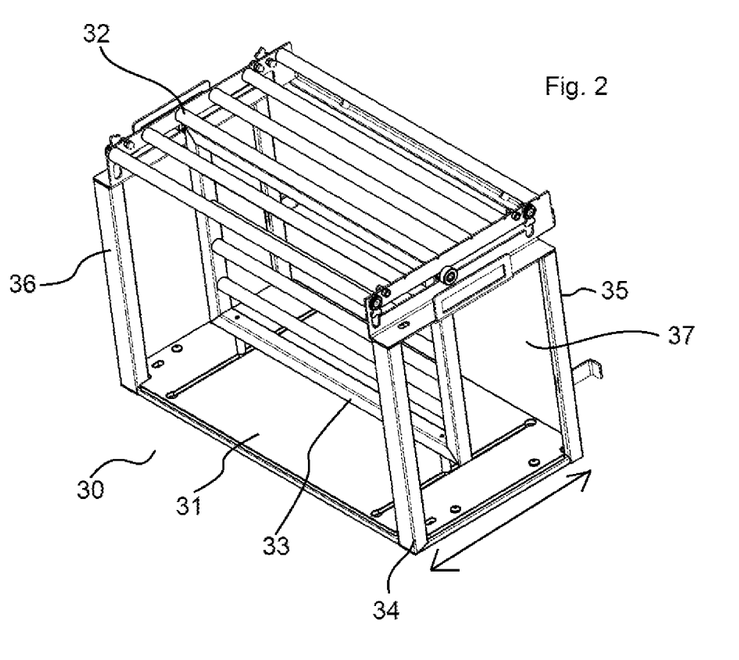
FIG. 2 shows a perspective view of porch for cages according to an embodiment of the present invention with the rear wall in an intermediate position.
Figure 3:
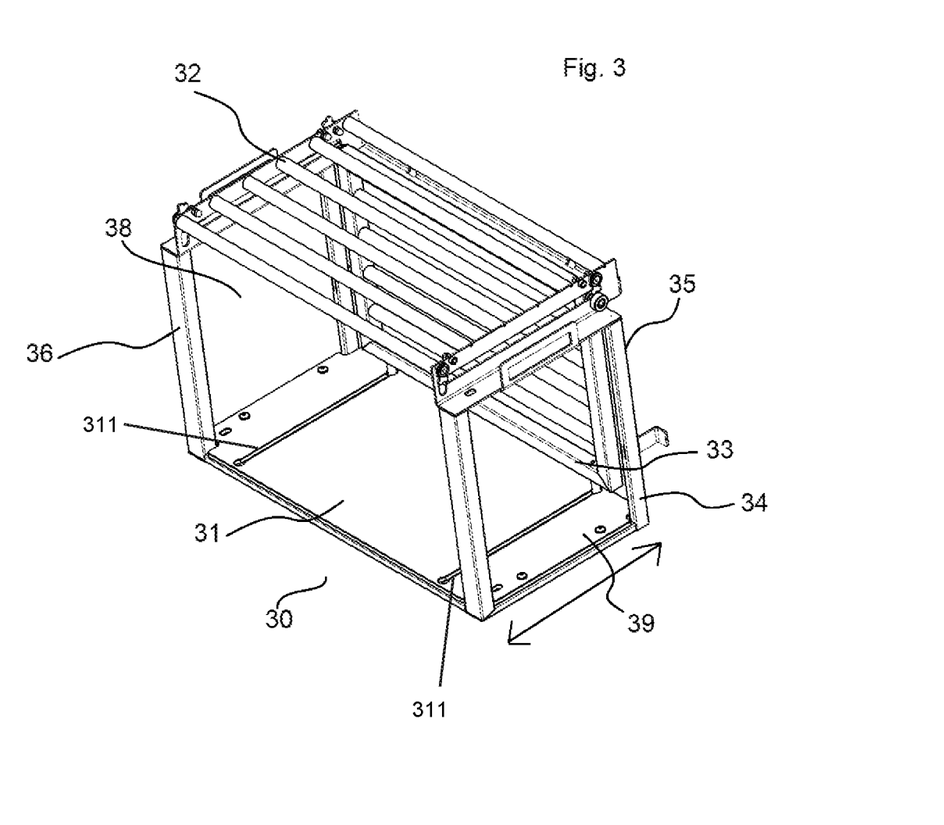
FIG. 3 shows a perspective view of a porch for cages according to an embodiment of the present invention with the rear wall in the forward end stop position.

As further shown, the gate 19 is attached to the exterior of the first side wall 14 of the box-shaped main body 11 and which illustratively comprises two doors or leaves 191 and 192 respectively (or also a single door or leaf 191 according to alternative embodiments). The doors are rotationally switchable to open and closed positions by one or more hinges 194 (see e.g., FIGS. 4-6) from which the doors 191/192 can be rotated into the second inner space Si2 of the attached secondary body 30, wherein both side walls 34 and 36 respectively, mutually opposite and parallel, are "open" or at least each comprise a respective opening 39 and 38 respectively, as shown in FIGS. 1-3. Obviously, according to the alternative embodiment in which the gate 19 comprises a single door or leaf, only one of the walls 34 and 36 will be "open" or at least include an opening.

The (plan) dimensions of the walls 34 and 36 respectively substantially correspond to those of the door 191 and of the door 192 respectively, wherein it is apparent that the rotational switching of said doors 191 and 192 from said first position to said second position (as indicated by the arrows and therefore outwards of the body 11 to clear the opening 18) results in the positioning of the doors 191 and 192 at the side wall 36 and of the side wall 34 of the porch 30 respectively, and thus in the closing of the openings 38 and 39 of the wall 36 and the wall 34 respectively.

Once switched to the opening position, the doors 191 and 192 each constitute an integral part of the porch 30, helping to confine the inner space Si2 defined by the porch 30.

A further peculiarity of the porch 30 according to the present invention is that, as depicted in FIGS. 1 to 3, the rear wall 33 of the porch 30 is translationally switchable (as shown by the double arrows) and in particular positionable near the front wall 14 of the box-shaped body 11 to close both the opening 37 defined by the front wall 35 of the porch 30 and the opening 18 of the front wall 14 of said main box-shaped body 11.

The wall 33 translationally is switchable along guides 311 (FIG. 3) formed in the bottom wall 31 of the porch 30 (not described in detail for the sake of brevity) and allows both an easy and effective restraint of animals in the main body 11 and the access to the animals through the porch 30, and thus without the need to remove or disassemble the porch 30 from the main body 11, wherein reference is made to the following description.

A further feature of the cage according to the present invention is depicted in FIGS. 4, 5, 8, and 9.

As depicted, there is an intermediate wall or partition 40 (also named immobilizer for reasons that will be apparent in light of the following description) inside the box-shaped body 11, said partition 40 being arranged parallel to the front wall 14 and the rear wall 16 of the body 11, as well as perpendicular to the mutually opposite walls 15 and 17 respectively. The partition 40, as indicated by the double arrow, is translationally switchable along a direction substantially perpendicular to said first front wall 14 between a first position, in which it is near said front wall 14 of said main box-shaped body 11, and a second position, in which it is adjacent to the rear side wall 16 of said main box-shaped body 11 opposite to said first front wall 14 of said main box-shaped body 11, the position in FIG. 5 being intermediate between the two aforesaid limit stop positions.

Therefore, it can be inferred that the positioning of the partition or immobilizer 40 near the front wall 14 results in the reduction of space available to the animals, and thus in at least partial immobilization of the animals themselves.

The access to the animals by an operator from outside the cage 10, e.g., for administering drugs or similar operations can be summarized as follows.

Figure 4:
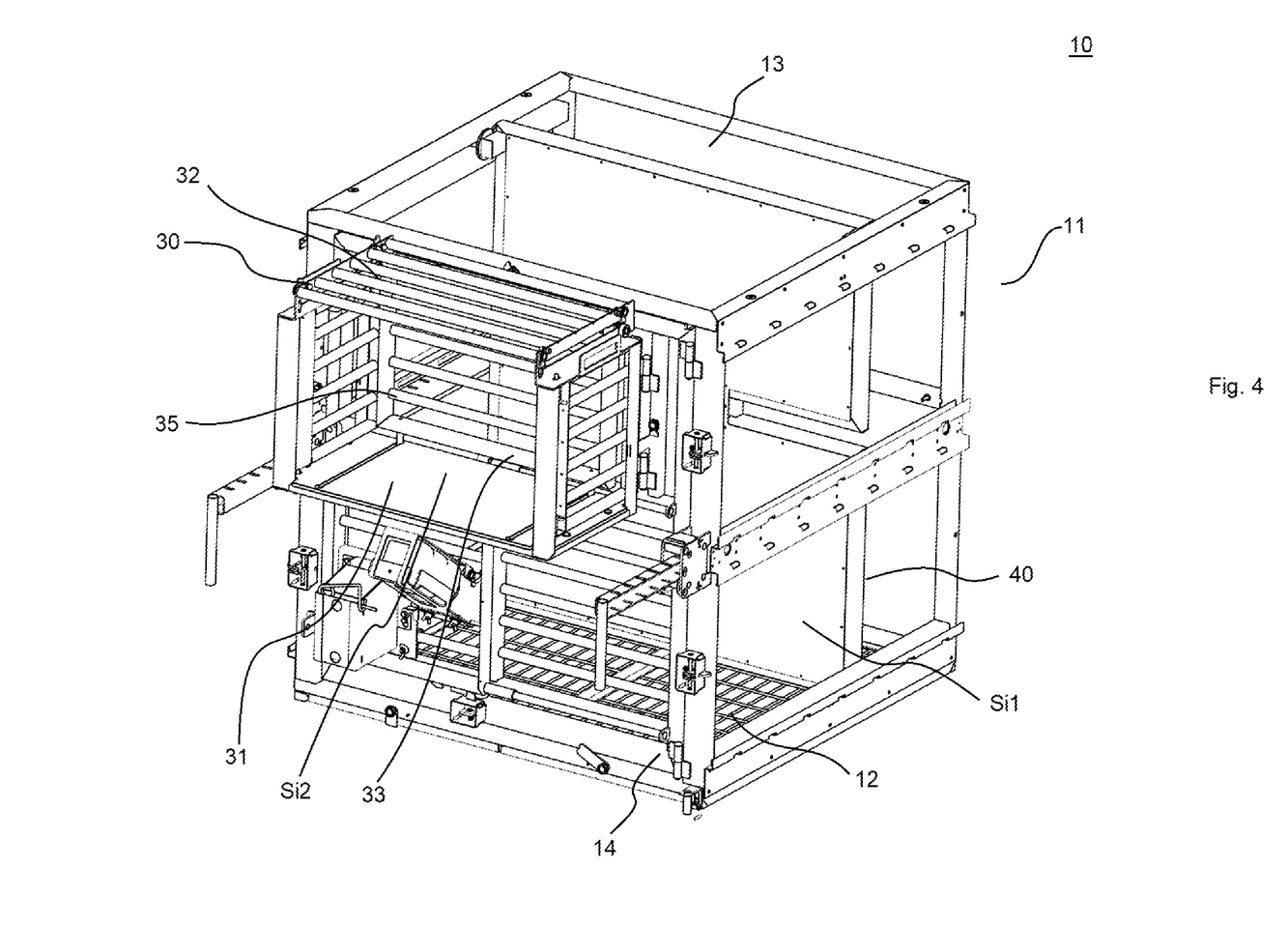
FIG. 4 shows a perspective front view of a cage with porch according to an embodiment of the present invention.
Figure 5:
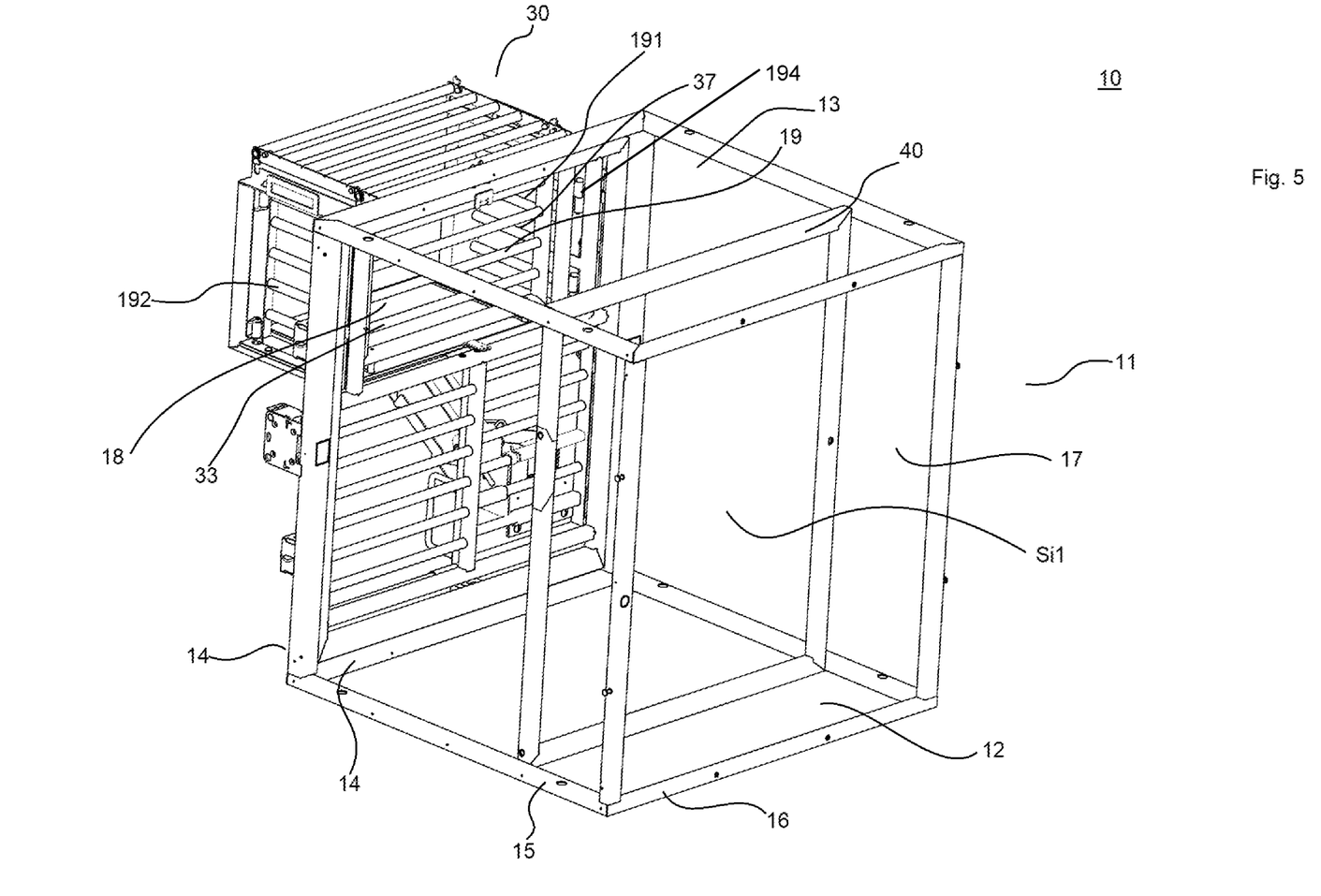
FIG. 5 shows a perspective rear view of a cage with porch according to an embodiment of the present invention.
Figure 6:
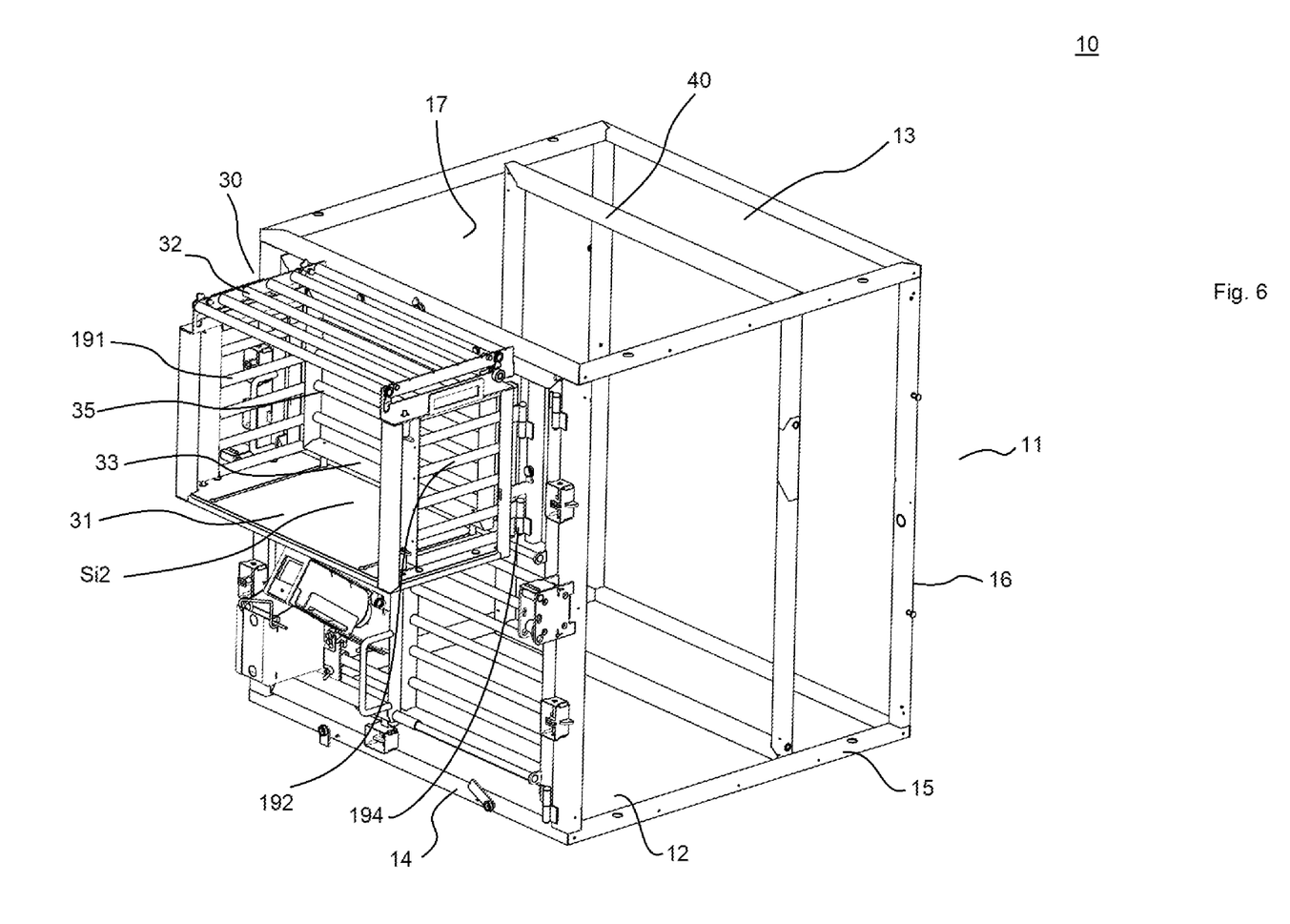
FIG. 6 shows a perspective front view of a cage with porch according to an embodiment of the present invention.
Figure 7:
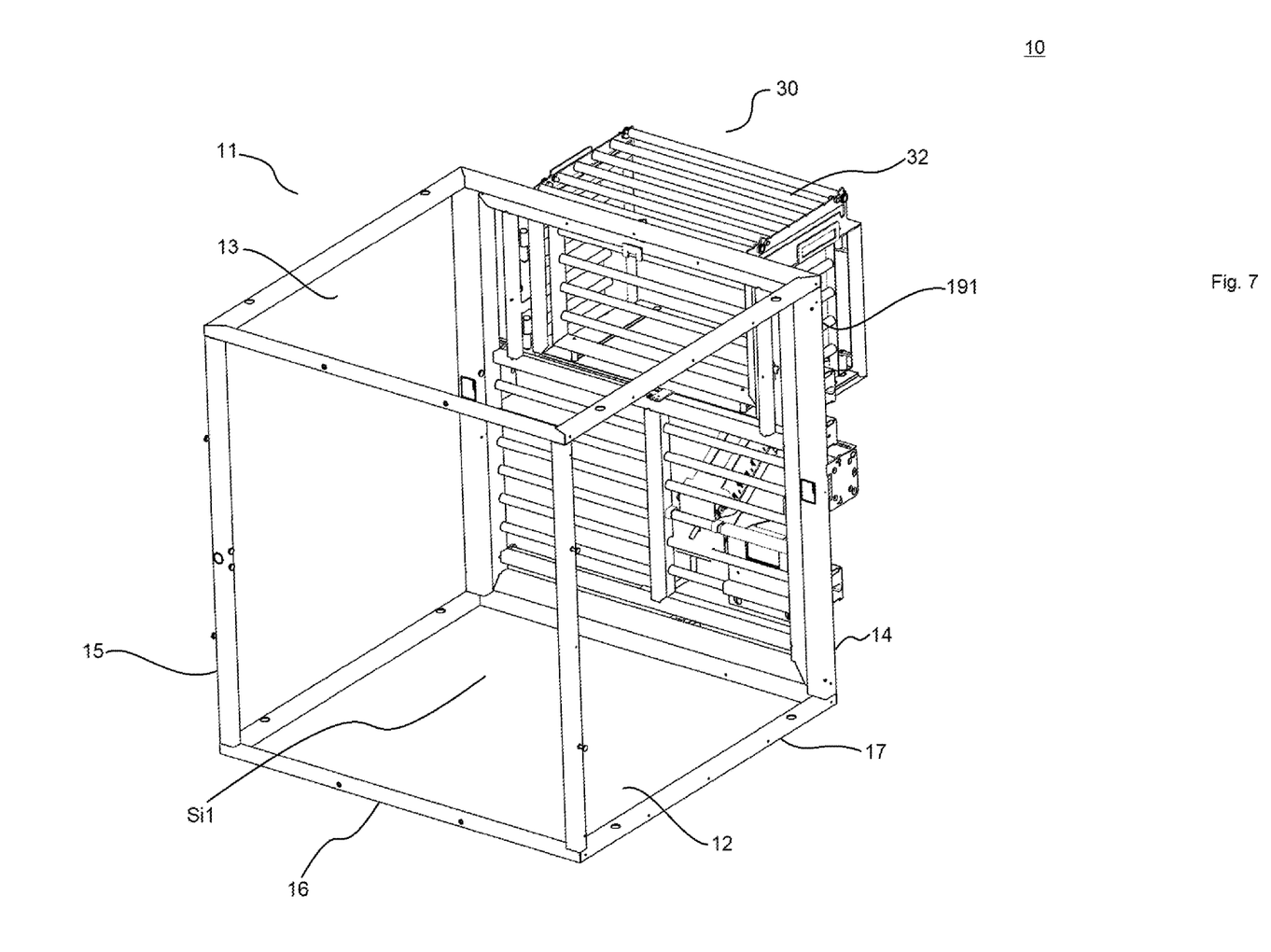
FIG. 7 shows a perspective rear view of a cage with porch according to an embodiment of the present invention.
Figure 8:
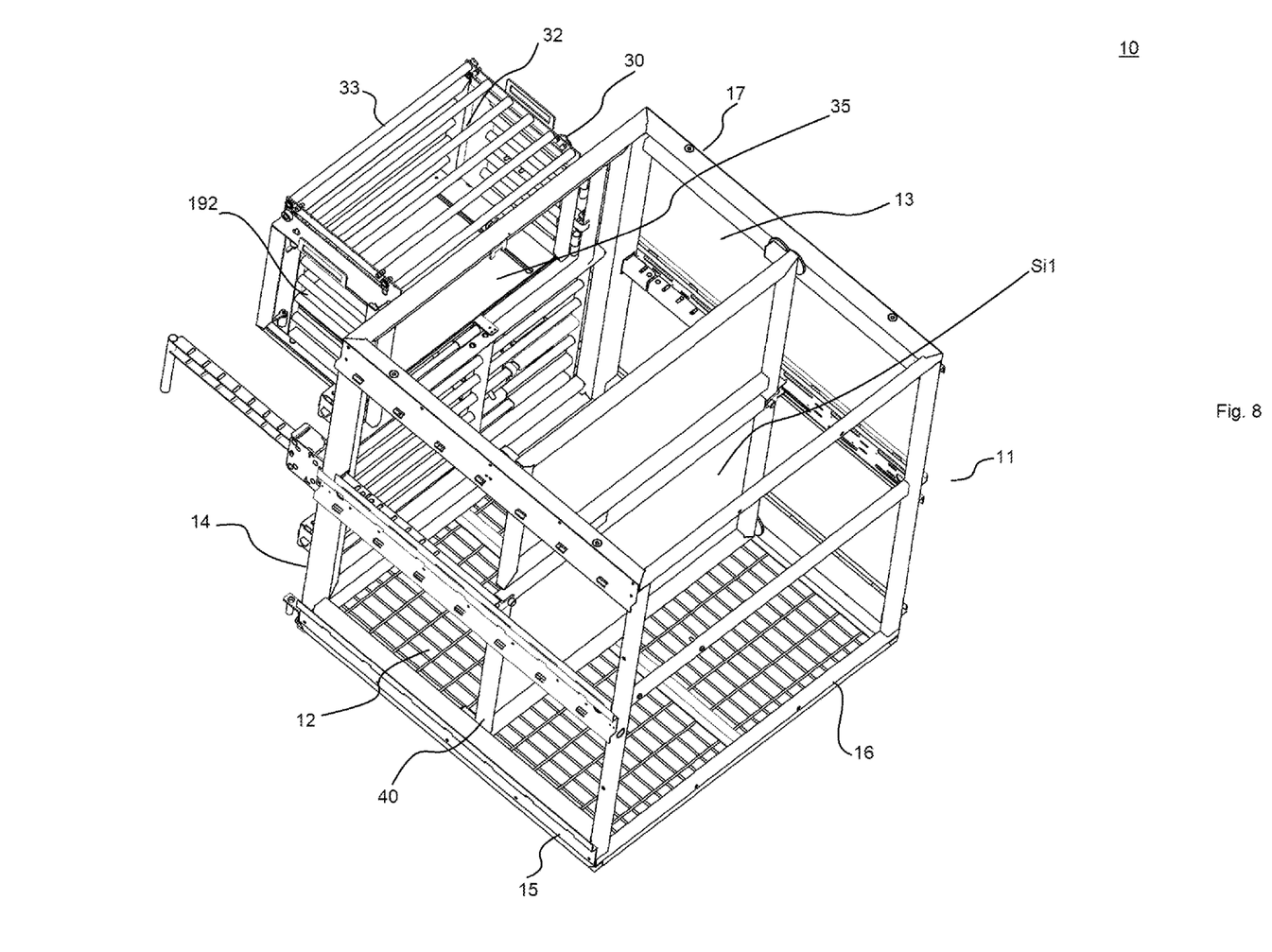
FIG. 8 shows a perspective front view of a cage with porch according to an embodiment of the present invention.
Figure 9:
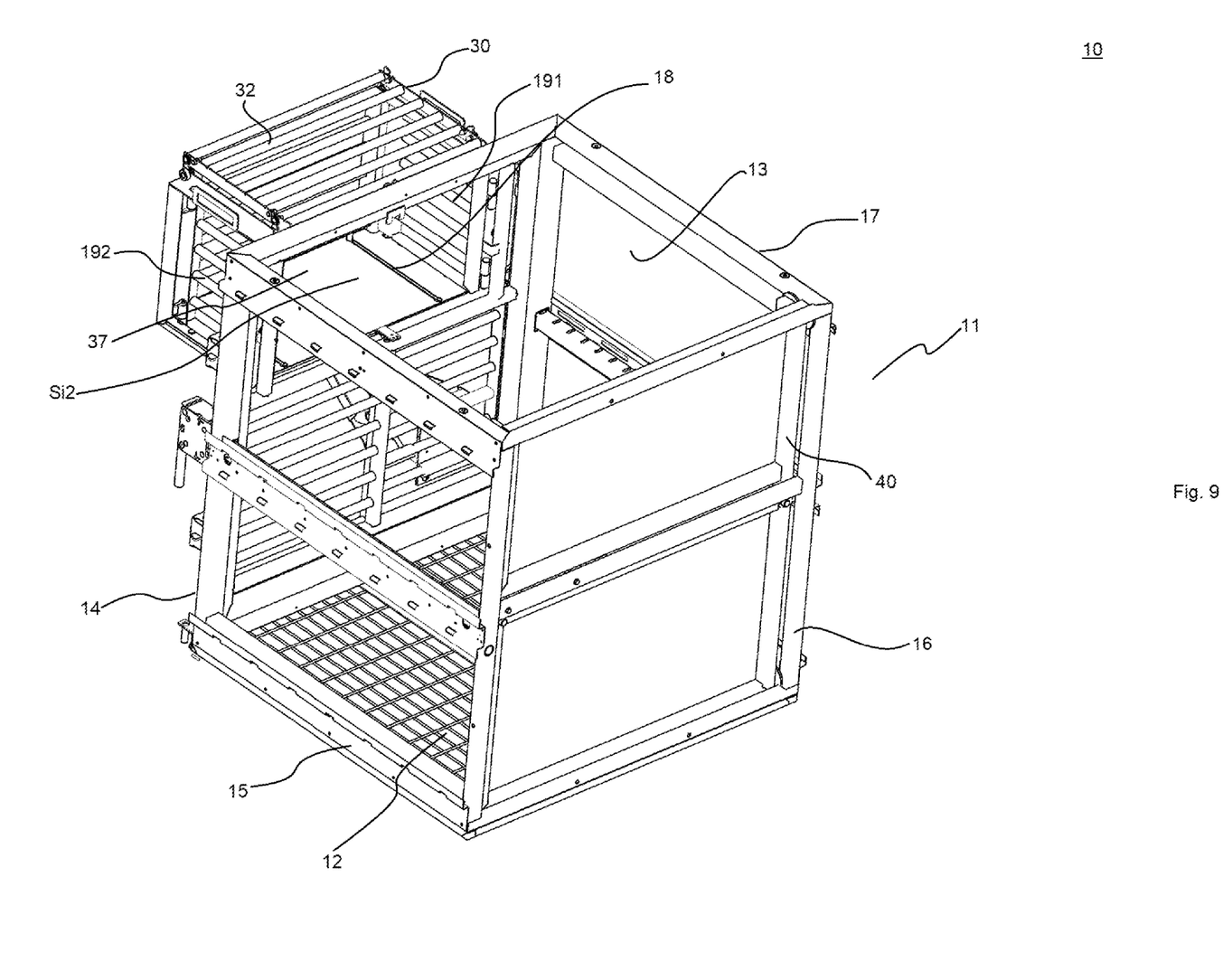
FIG. 9 shows a perspective rear view of a cage with porch according to an embodiment of the present invention.

Firstly, the rear wall 33 of the porch 30 is repositioned from the end stop position in FIG. 1 to the end stop position in FIG. 3 and FIGS. 4 and 6 in which the wall 33 closes both the opening 37 of the porch 30 and the opening 18 of the main body 11, thereby preventing animals from accessing from the body 11 to the porch 30. The next step comprises the translational switching of the partition 40 towards the front wall 14 of the body 11 until the partition 40 is positioned near the front wall 14, in particular until the desired degree of animal restraint between the partition 40 and the front wall 14 is achieved.

At this point, an operator can access the animals through the space Si2 defined by the porch 30, in particular, through the opening 37, and thus with no need to remove the porch 30 from the main body 11.

Further peculiarities of the porch according to the present invention are depicted in the figures and relate to the fact that, as shown and indicated by the double arrow in FIG. 1, the upper wall 32 of the porch or secondary box-shaped body 30 is rotationally switchable between a first closing position, in which it prevents access by an operator to said second inner space Si2, and a second opening position (represented by means of hatching in FIG. 1), in which it allows access to said second inner space Si2 by said operator, wherein the switching of the wall 32 to the opening position further facilitates access to animals (e.g. when at least partially immobilized between partition 40 and wall 14 in the manner described above) by an operator.

According to the embodiment shown, the upper wall 32 is rotationally switchable about a rotation axis R1 parallel to the intersection between the planes on which said bottom wall 31 of said secondary box-shaped body 30 and said first side (front) wall 14 of said main box-shaped body 11 respectively lie.

On the other hand, according to an alternative embodiment (not shown), the upper wall 32 is rotationally switchable about a rotation axis R2 parallel to the intersection between the planes on which said upper wall 32 of the porch or the box-shape secondary body 30 and respectively said rear wall 33 of said porch or secondary body 30 lies, whereas according to a further alternative embodiment (not shown), the upper wall 32 is translationally switchable on a plane parallel to the bottom wall 31 of the porch or secondary body 30.

The present invention allows the widest choice of materials and conformations for making the parts of the box-shaped body 11 and the box-shaped body 30. For example, at least said rear side wall 33 of said main box-shaped body 30 may comprise at least one mesh-shaped portion or a portion comprising tubular elements made of plastic or metal material. Similarly, each or at least some of the side and bottom walls of the main body 11 and the secondary body or porch 30 may comprise at least one mesh-shaped portion or a portion comprising tubular elements made of plastic or metal material.

It has thus been demonstrated by means of the detailed description given above of the embodiments of the present invention as depicted in the drawings that the present invention makes it possible to obtain the desired results and to overcome or at least limit the drawbacks affecting the prior art.

In particular, by means of the present invention, a cage with porch for housing laboratory animals is provided which is designed so that the porch does not constitute a hindrance and/or obstacle to an operator needing gain access to the animals, and thus which does not need to be removed to allow access to the animals by an operator.

Furthermore, the porch according to the present invention is adapted to be fixed and removed respectively to and from the main body of a cage according to simple and immediate operations which do not require the use of tools, thereby further reducing the risk of injury to animals.

Finally, by means of the present invention, a cage for housing laboratory animals is provided that comprises an innovative gate the switching of which from opening to the closing position does not generate any risk of entrapment or possible injury for the animal.

Although the present invention is explained above by means of a detailed description of the embodiments thereof as depicted in the drawings the present invention is obviously not limited to the embodiments described above and depicted in the drawings; on the contrary, all the variants and/or changes to the embodiments described and depicted in the accompanying drawings which will be apparent and immediate to a person skilled in the art fall within the scope.

The scope of protection of the present invention is thus defined by the claims.

We claim:

1. A cage for housing laboratory animals, said cage comprising:

a main box-shaped body having a bottom wall, an upper wall and a plurality of side walls, said bottom wall, upper wall and side walls being connected and joined together to define a first inner space available to said laboratory animals, wherein a first side wall of said main box-shaped body comprises a first opening adapted to allow the access to said inner space from the outside by an operator, and wherein said first side wall comprises a gate which is switchable between a first position, which at least partially closes said first opening, and a second position which it at least partially clears said first opening;

a secondary box-shaped body having a bottom own wall thereof, an upper own wall thereof and a plurality of own side walls thereof, said own bottom wall, upper wall and side walls of said secondary box-shaped body being connected and joined together to define a second inner space, wherein a first own side wall of said secondary box-shaped body comprises a second opening, said secondary box-shaped body being adapted to be externally applied to said first side wall of said main box-shaped body with said second opening positioned at said first opening so as to allow said laboratory animals, with said gate in said second position, to access from said first inner space to said second inner space and vice versa, from said second inner space to said first inner space; and wherein said gate comprises a door which is rotationally switchable into said second inner space, wherein a second own side wall of said secondary box-shaped body joined to said first own side wall of said secondary box-shaped body comprises a third opening, and wherein the switching of said door from said first position to said second position results in the closing of said third opening.

2. The cage according to claim 1, wherein said gate comprises two doors, each being rotationally switchable, wherein a third own side wall of said secondary box-shaped body joined to said first side wall and opposite to said second side wall of said secondary box-shaped body comprises a fourth opening, and wherein the switching of said doors from said first position to said second position results in the closing of said third opening and fourth opening, respectively.

3. The cage according to claim 1, wherein the own side wall of said secondary box-shaped body opposite to said first side wall of said secondary box-shaped body is switchable and positionable so as to close both said second opening of said own first wall of said secondary box-shaped body and said first opening of said first side wall of said main box-shaped body.

4. The cage according to claim 3, wherein said own side wall of said secondary box-shaped body opposite to said first side wall of said secondary box-shaped body is translationally switchable along parallel guides defined by said own bottom wall of said secondary box-shaped body.

5. The cage according to claim 1, wherein said own upper wall of said secondary box-shaped body is switchable between a first closed position, in which it prevents the access to said second inner space by an operator, and a second open position, in which it allows the access to said second inner space by an operator.

6. The cage according to claim 5, wherein the own upper wall of said secondary box-shaped body is rotationally switchable about a rotation axis (R1) parallel to the intersection between the planes on which said own bottom wall of said secondary box-shaped body and said first side wall of said main box-shaped body, respectively, lie.

7. The cage according to claim 5, wherein said own upper wall of said secondary box-shaped body is translationally switchable on a plane parallel to said own bottom wall of said box-shaped secondary body.

8. The cage according to claim 1, wherein said cage comprises an intermediate wall positioned inside said main body and substantially parallel to said first side wall, and wherein said intermediate wall is translationally switchable along a direction which is substantially perpendicular to said first side wall of said main box-shaped body.

9. The cage according to the preceding claim 8, wherein said intermediate wall is switchable between a first position, in which it is close to said first side wall of said main box-shaped body, and a second position, in which it is adjacent to the side wall of said main box-shaped body opposite to said first side wall of said main box-shaped body, and wherein the translational switching of said intermediate wall from said second position to said first position results in the reduction of the space available to said laboratory animals.

10. The cage according to claim 1, wherein the side walls of said main box-shaped body are opposite and parallel two by two and have two-by-two corresponding dimensions.

11. The cage according to claim 1, wherein said bottom wall and upper wall of said main box-shaped body are parallel and have corresponding dimensions.

12. The cage according to claim 1, wherein the own side walls of said secondary box-shaped body are opposite and parallel two by two and have two-by-two corresponding dimensions.

13. The cage according to claim 1, wherein said own bottom wall and own upper wall of said secondary box-shaped body are parallel and have corresponding dimensions.

14. The cage according to claim 1, wherein at least said first wall of said main box-shaped body comprises a mesh-shaped portion or a portion including tubular elements and made of plastic or metal material.

15. The cage according to claim 1, wherein at least said own side wall of said secondary box-shaped body, which is opposite to said first side wall of said secondary box-shaped body and is switchable and positionable so as to close both said second opening of said first own wall of said secondary box-shaped body and said first opening of said first side wall of said main box-shaped body, comprises a mesh-shaped portion or a portion including tubular elements.

* * * * *